US012297088B1

(12) United States Patent
Swanson

(10) Patent No.: US 12,297,088 B1
(45) Date of Patent: May 13, 2025

(54) PORTABLE VERTICAL PLATFORM LIFT

(71) Applicant: Neil James Swanson, Prescott, MI (US)

(72) Inventor: Neil James Swanson, Prescott, MI (US)

( * ) Notice: Subject to any disclaimer, the term of this patent is extended or adjusted under 35 U.S.C. 154(b) by 142 days.

(21) Appl. No.: 18/670,357

(22) Filed: May 21, 2024

(51) Int. Cl.
*B66F 7/06* (2006.01)

(52) U.S. Cl.
CPC ...... *B66F 7/0658* (2013.01); *B66F 2700/123* (2013.01)

(58) Field of Classification Search
CPC .......... B66F 7/0658; B66F 7/08; B66F 7/065; B66F 7/246; B66F 7/243; B66F 7/0608
See application file for complete search history.

(56) References Cited

U.S. PATENT DOCUMENTS 3,237,921 A * 3/1966 Jay ........................ B66F 7/0625 187/250
5,192,053 A * 3/1993 Sehlstedt ................ B66F 7/065 182/69.5
6,182,796 B1 * 2/2001 Perlstein ................. B66F 7/065 187/219
7,163,087 B2 * 1/2007 Putnam ................. B66F 7/0641 187/203
7,188,824 B2 * 3/2007 Blake .................... B66F 7/0608 254/122
10,221,054 B2 * 3/2019 Taylor ................... B66F 7/0666
2003/0189194 A1 * 10/2003 Latvys ...................... B66F 7/08 254/9 C
2011/0240409 A1 * 10/2011 Bacon ..................... B66F 7/065 187/269
2012/0241698 A1 * 9/2012 Swasey ..................... B66F 3/22 254/122
2015/0034893 A1 * 2/2015 Bacon ....................... B66F 3/46 254/290

* cited by examiner

*Primary Examiner* — Seahee Hong

(57) ABSTRACT

This invention details a portable Vertical Platform Lift. This Portable Vertical Platform Lift (PVPL) is specifically designed to be transported and set up by a single individual and be used by a disabled person needing to enter a building or structure that is at a height of approximately two to three steps. The device is also useful for material handlers. This design has three key enablers. The first key enabler and most critical to the design is a two-stage lift mechanism. The first stage provides considerable leverage albeit at a slower lift speed to initially raise the platform from a low-profile position. The low-profile position is necessary for ease of ingress onto or egress off of the lift platform. The second stage provides increased vertical lift speed to the desired top position. The second key enabler is the light-weight design. The third key enabler is the compact design.

2 Claims, 26 Drawing Sheets

Typical Two-Step Entrance

Typical Two-Step Entrance

Portable Vertical Platform Lift (PVPL) Placement

PVPL Lowered to Floor/Ground

PVPL Lift Sections Opened

Figure 1:
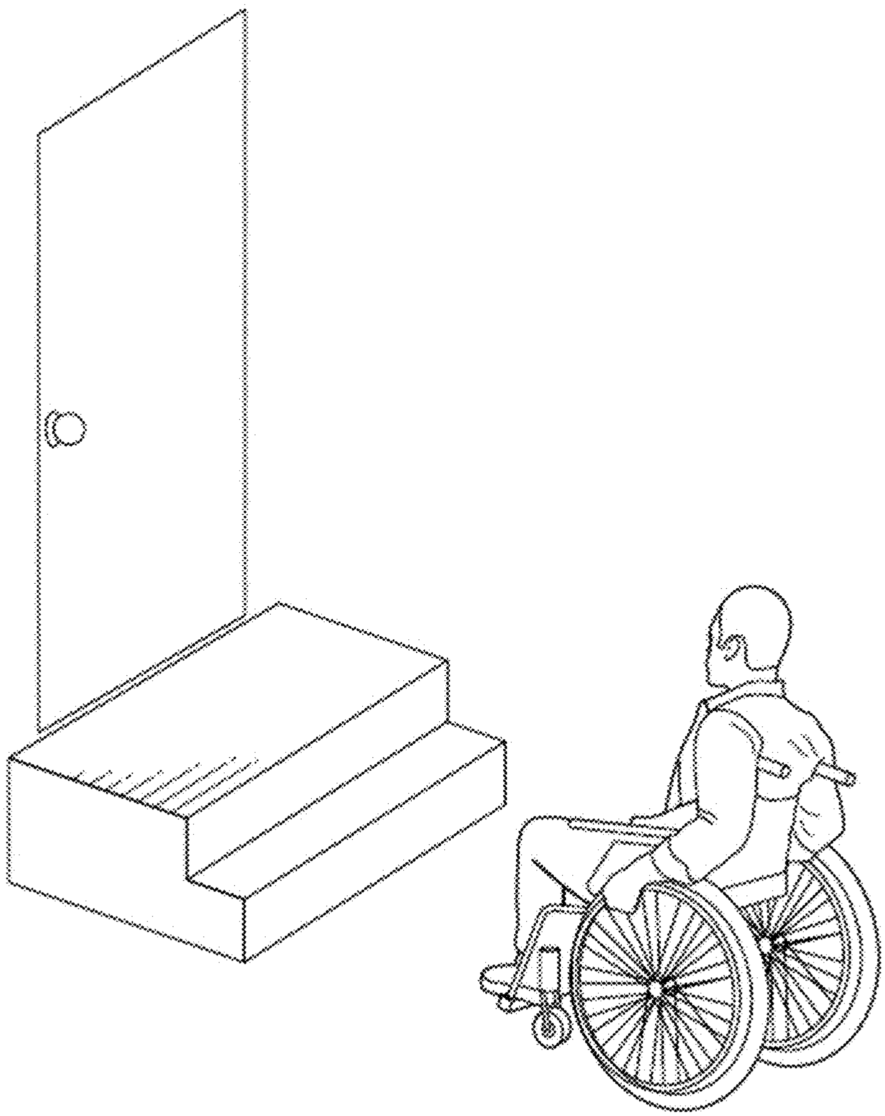

PVPL Ramps Being Deployed for Floor/Ground Ingress

PVPL Ready for Loading

PVPL Loaded with Ramps Closing

PVPL Loaded and Ready to Lift

PVPL Fully Raised

PVPL with Occupant Egressing

PVPL Opened with Ground Ramp Deployed
and Elevation Ramp Set for Security

PVPL with Ramps Set at the 90 Degree Vertical Security Position

PVPL at Full Height

PVPL at Full Height Opposite View

PVPL at Full Height Underside View

PVPL with Elevation Ramp Fully Deployed

PVPL Elevation Side Security Fence Detail

Stage One Position Side View

Stage One Position Plan View

Telescoping Push Rod Fully Collapsed Side View

Telescoping Push Rod Fully Collapsed Cross Section Side View

Stage One to Stage Two Transition Position Side View

Stage One to Stage Two Transition Position Plan View

Stage Two Position Full Height Side View

Telescoping Push Rod Fully Extended Side View

Telescoping Push Rod Fully Extended Side View Cross Section

PORTABLE VERTICAL PLATFORM LIFT

BACKGROUND

A vertical lift platform is a necessary enabler for people with disabilities that require the use of either a wheel chair or walker to allow freedom of movement from the ground up to various heights that is restricted due to steps. It is also beneficial to material handlers needing to move heavy loads. Long ramps are often used for homes and businesses, but require large areas and are usually fixed in position. Some short, compact, light-weight ramps are available for access to low rises and are readily available in the market place for portable usage. Large Vertical Platform Lifts (VPLs) are available for permanent installations or for mobile use in a confined area that does not require transporting the VPL. The device detailed in this patent fills a product void. It is a light-weight, portable vertical platform lift that addresses a disabled persons mobility needs between small, light-weight ramps and large vertical lift platforms.

SUMMARY

A Portable Vertical Platform Lift (PVPL) is used by a disabled person to enter a building with two to three steps. The PVPL is made of lightweight materials, is compact, has a low profile, and can be powered by a 12 volt battery or 120/240 volt ac that can also be used to charge the battery. The PVPL may be easily maneuvered into position and set up by one person with a two-wheel dolly. The PVPL may be transported with a vehicle or easily stored and used as needed. The dolly can remain attached or moved as needed. The dolly includes a manual up/down switch, automatic controls if desired and a power supply. The PVPL is of a bifold design consisting of two low-profile scissor lifts hinged coupled to raise and lower together. When opened the PVPL is full size and includes a ground ramp and an elevation ramp hinged coupled to the platform. Security fences are deployed when the ramps are deployed. The ground ramp is a bifold design that doubles the ramp length to support ADA ramp dimensional requirements for ingress/egress. This allows the disabled person with a wheelchair or walker to enter or leave the platform at ground level. The elevation ramp is an egress/ingress ramp that allows the disabled person to leave or enter the platform at the elevated height. The ramps are locked in place in two different positions. When the two bifold lift sections are opened the ramps are locked in the closed positions. The ramps are also locked in the vertical (90 degree) position for the lift to be in motion and provide the occupant with security. The platform can be set up by an assistant and manually raised or lowered by an up/down switch. The entire PVPL after set up can also be automated with actuators for opening and closing the ramps, and raising or lowering the lift using remote control.

DRAWING DESCRIPTIONS

FIG. 1: Typical Two-Step Entrance

Figure 2:
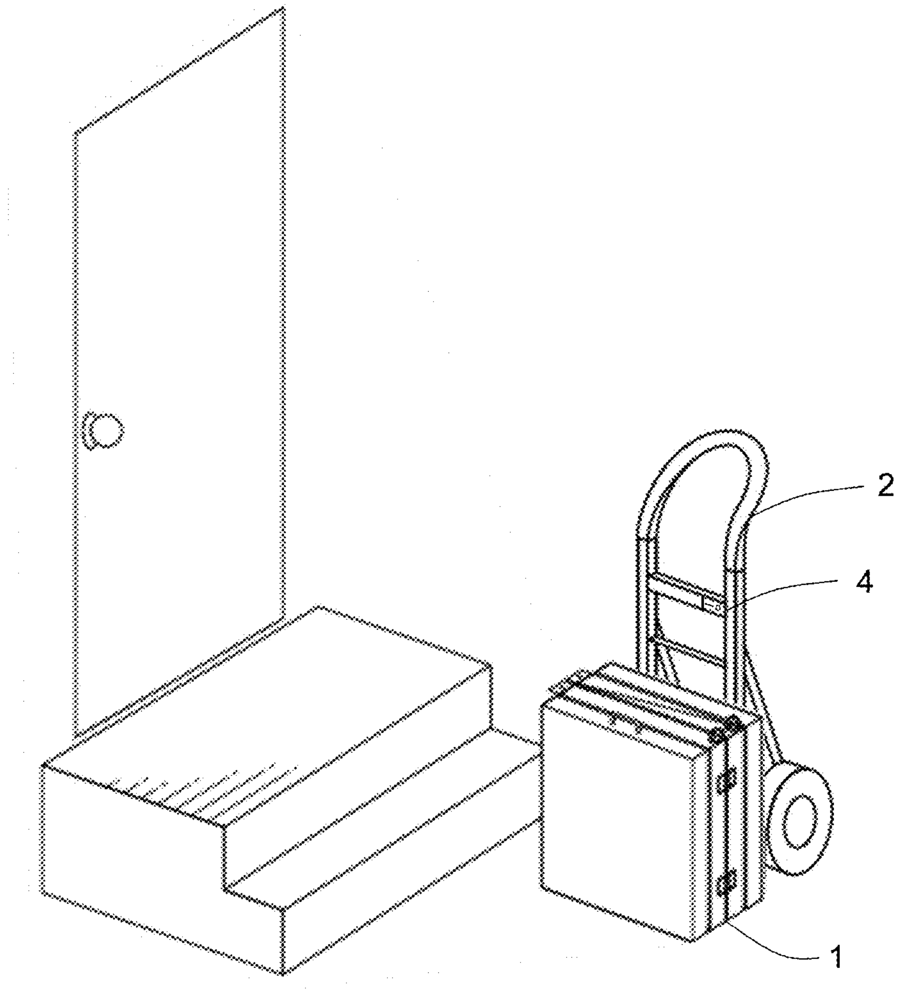

FIG. 2: Portable Vertical Platform Lift (PVPL) Placement

Figure 3:
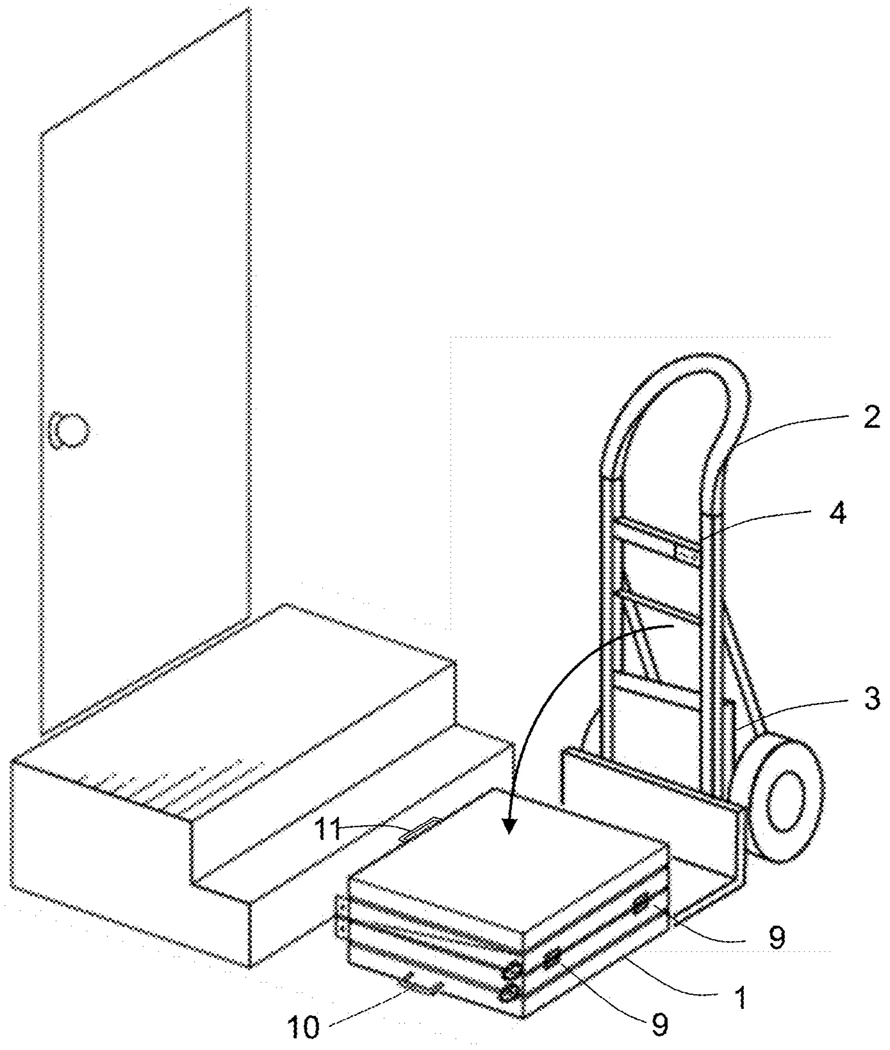

FIG. 3: PVPL Lowered to Floor/Ground

Figure 4:
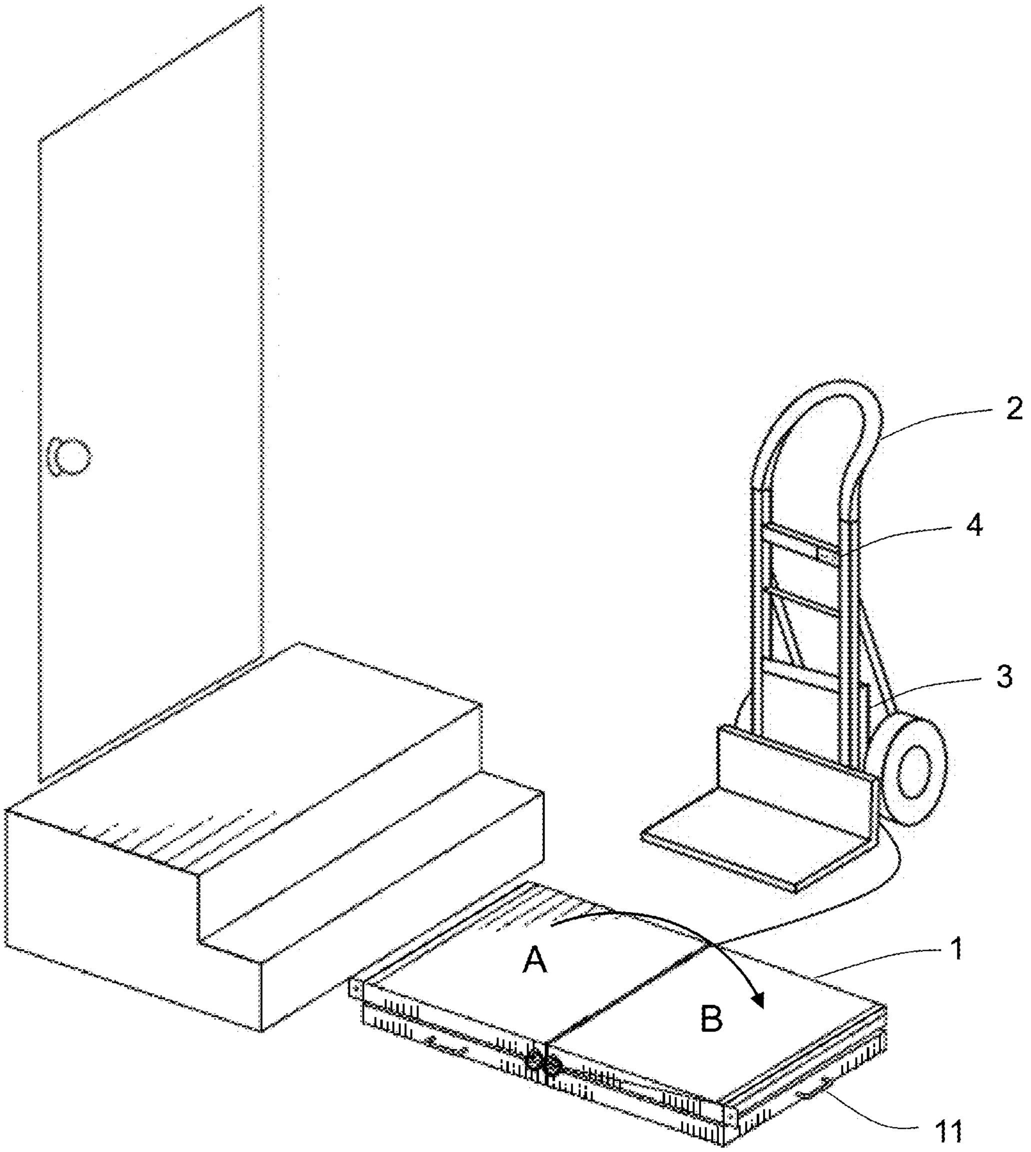

FIG. 4: PVPL Lift Sections Opened

Figure 5:
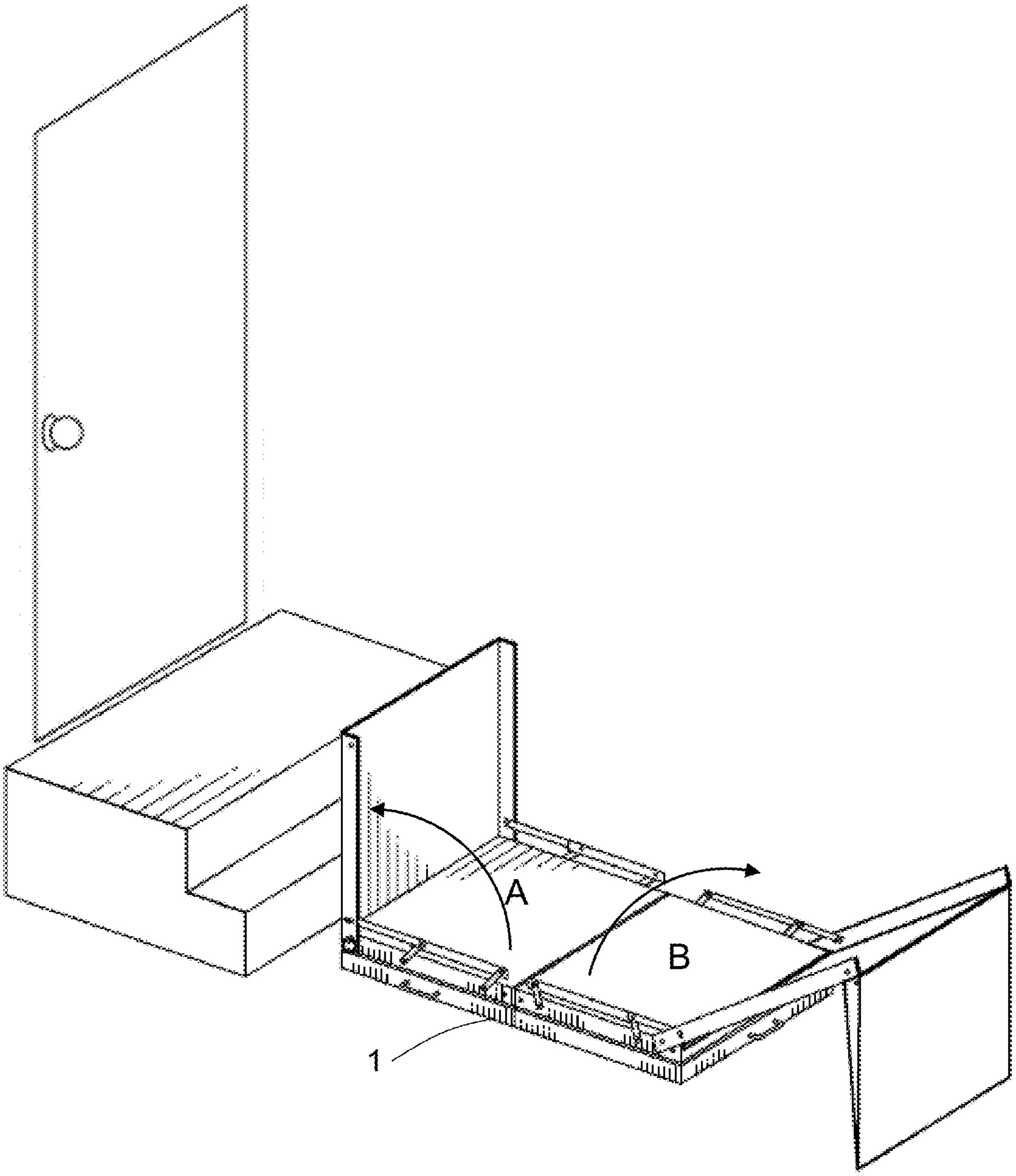

FIG. 5: PVPL Ramps Being Deployed for Floor/Ground Ingress

Figure 6:
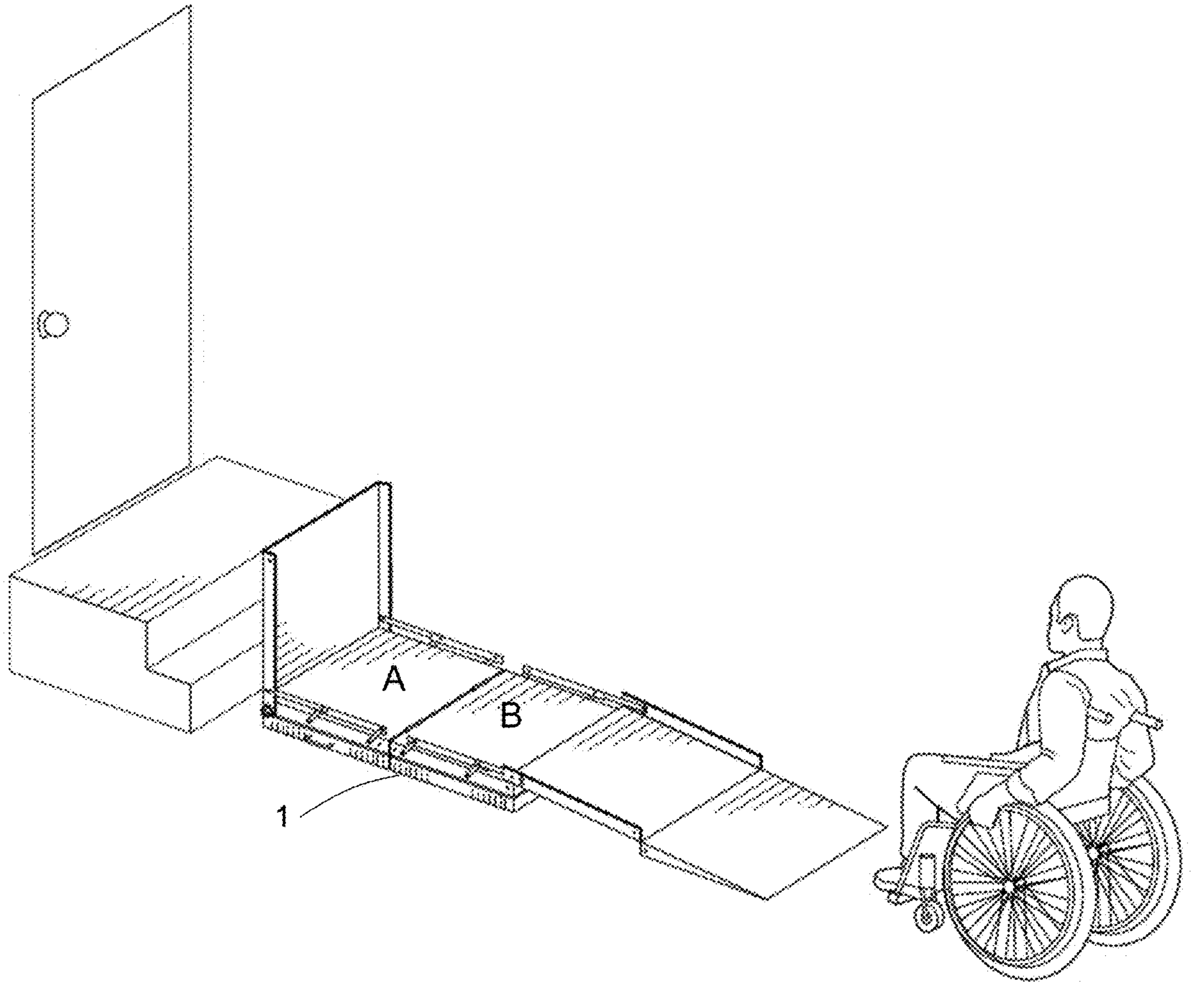

FIG. 6: PVPL Ready for Loading

Figure 7:
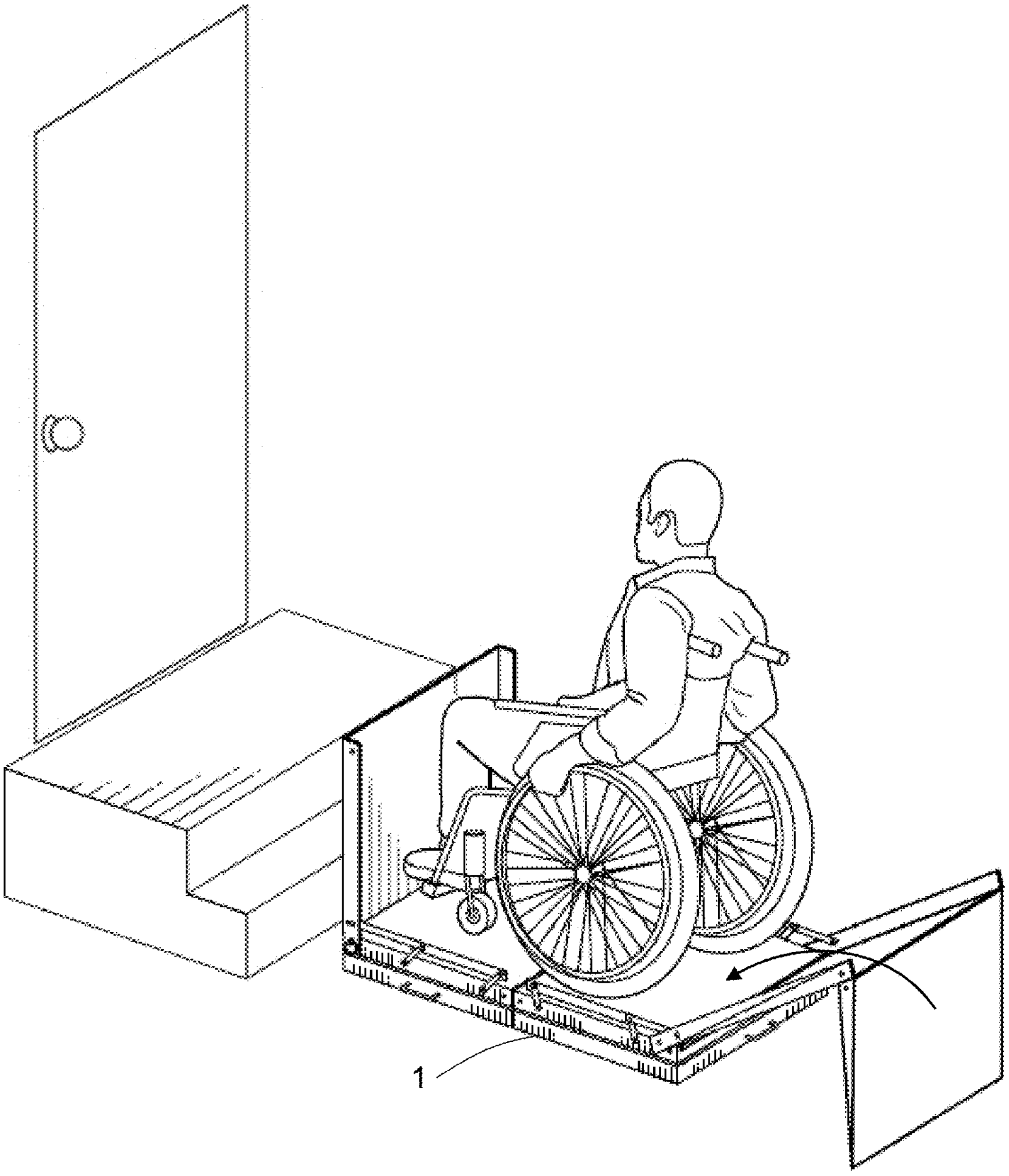

FIG. 7: PVPL Loaded with Ramps Closing

Figure 8:
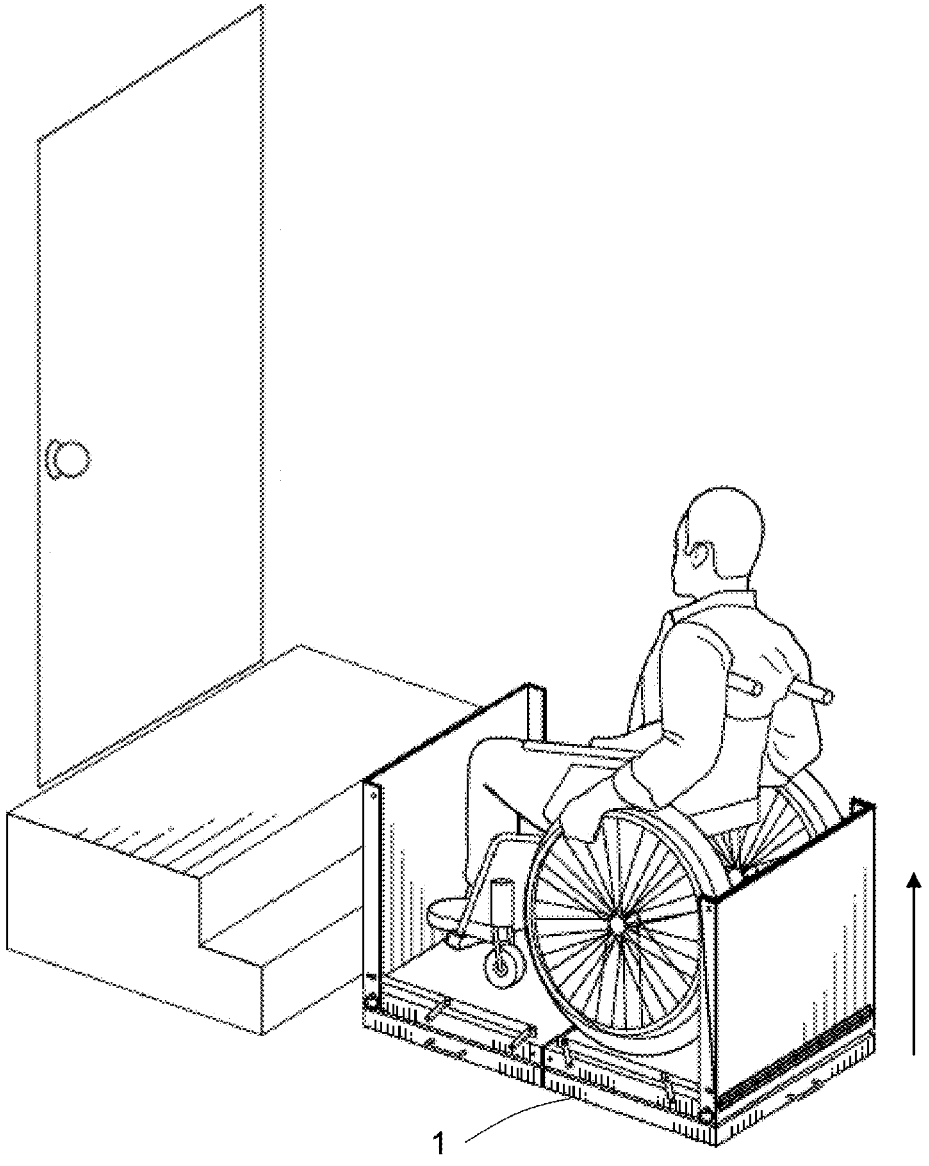

FIG. 8: PVPL Loaded and Ready to Lift

Figure 9:
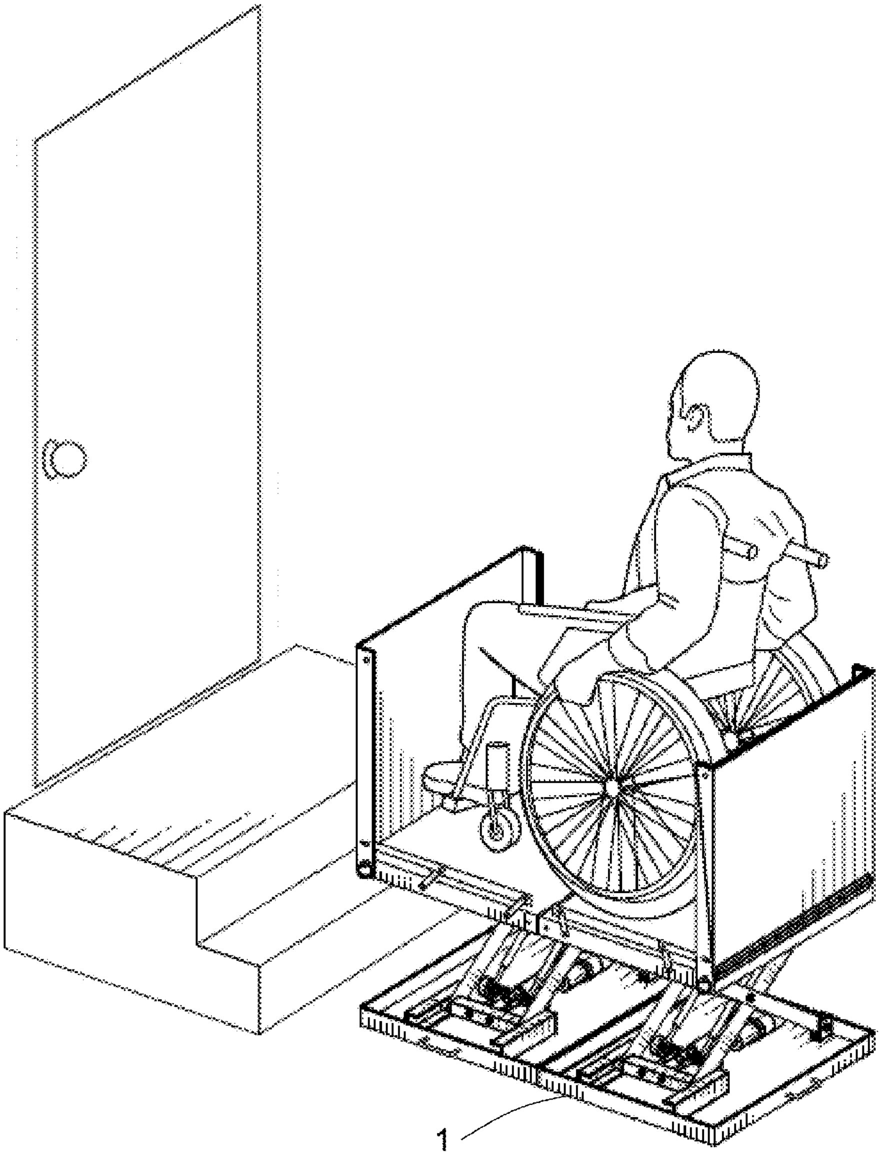

FIG. 9: PVPL Fully Raised

Figure 10:
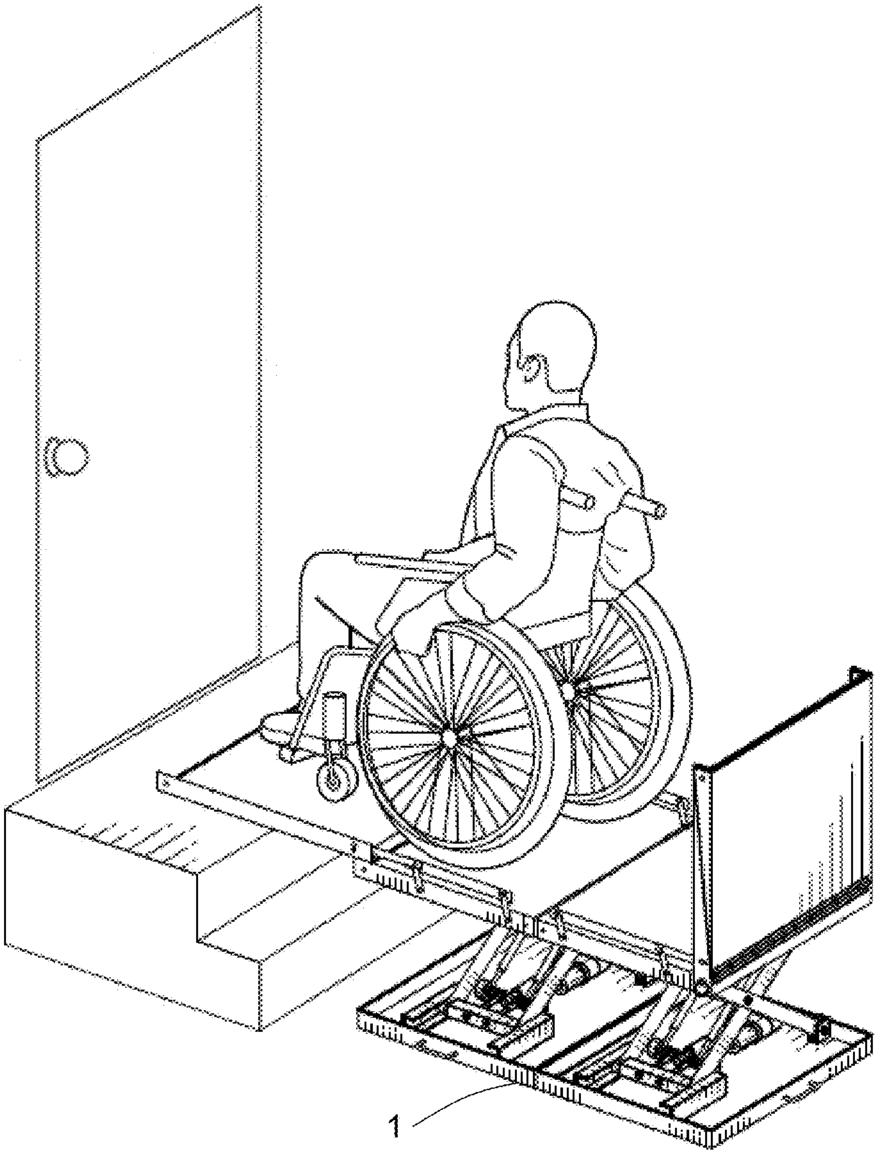

FIG. 10: PVPL with Occupant Egressing

Figure 11:
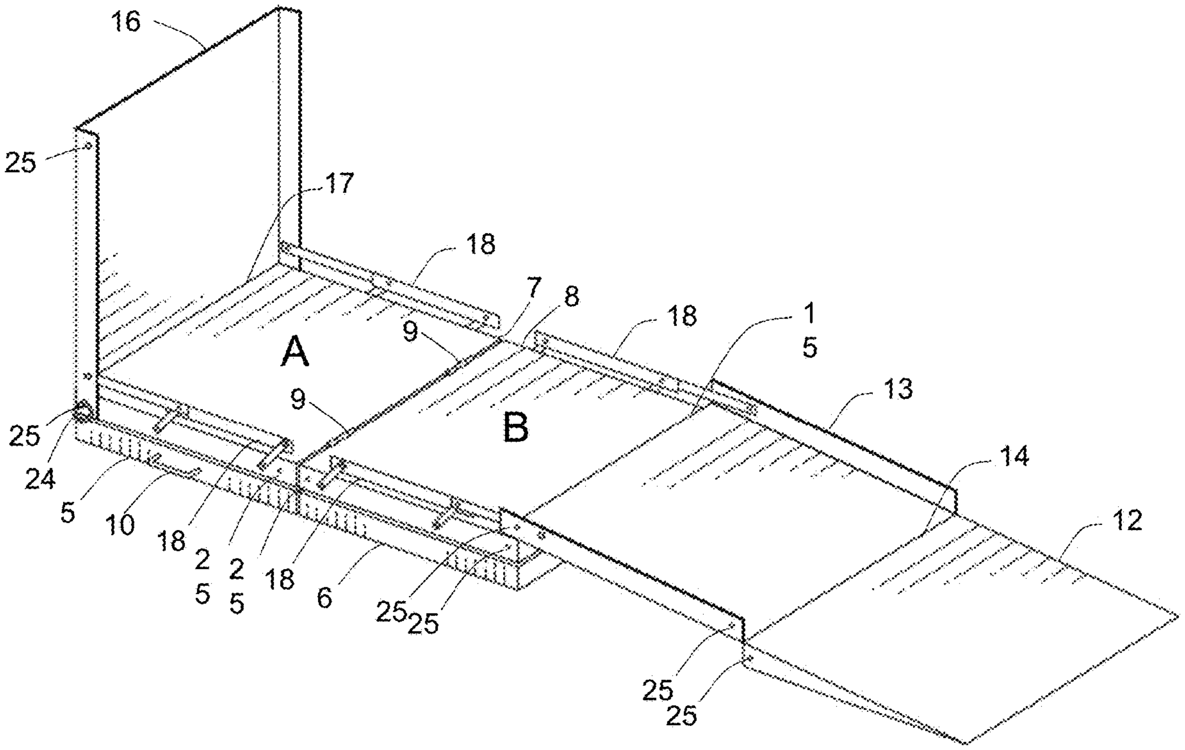

FIG. 11: PVPL Opened with Ground Ramp Deployed and Elevation Ramp Set for Security FIG. 12: PVPL with Ramps Set at the 90 Degree Vertical Security Position FIG. 13: PVPL at Full Height FIG. 14: PVPL at Full Height Opposite View FIG. 15: PVPL at Full Height Underside View FIG. 16: PVPL with Elevation Ramp Fully Deployed FIG. 17: PVPL Elevation Side Security Fence Detail FIG. 18: Stage One Position Side View FIG. 19: Stage One Position Plan View FIG. 20: Telescoping Pushrod Fully Collapsed Side View FIG. 21: Telescoping Pushrod Fully Collapsed Cross Section Side View FIG. 22: Stage One to Stage Two Transition Position Side View FIG. 23: Stage One to Stage Two Transition Position Plan View FIG. 24: Stage Two Position Full Height Side View FIG. 25: Telescoping Pushrod Fully Extended Side View FIG. 26: Telescoping Pushrod Fully Extended Side View Cross Section

GENERAL DESCRIPTION—SETUP AND FUNCTIONAL FLOW

FIGS. 1 through 10 show the setup and flow of the Portable Vertical Platform Lift (PVPL) 1. Detailed description follows in FIGS. 11-26. FIG. 1 is a typical two-step entry. Ingres or egress of a disabled person in either a wheelchair or walker is prohibitive without a ramp or lift. A ramp of appropriate angle would need to be permanent and extremely long. Any lift that is currently available in the market place would be oversized and very costly for this application. FIG. 2 shows the placement of the PVPL 1 in front of the stairs. The PVPL 1 can be maneuvered in place with a two-wheel dolly 2 as shown. FIG. 3 shows the PVPL 1 lowered in place with the use of handle A 10 and ready to be opened to a full-size lift platform with handle B 11 to accommodate a wheelchair or walker. The PVPL 1 is a bifold design with two separate lift sections hinge 9 coupled together. The PVPL 1 is made of light-weight, high-strength materials, low-profile, compact and has a battery or 120/240 v ac power supply 3 that can also be used to charge the battery. The two-wheel dolly 2 has the power supply 3 and up/down switch 4. FIG. 4 shows the lifting sections opened using handle B 11 creating a full-size, low-profile lift platform. The two-wheel dolly 2 can be permanently attached to the PVPL or separate as shown retaining the power supply 3 and up/down switch 4. There are two ramps hinge coupled to the platform. FIG. 5 shows the two ramps being opened. Each ramp has three positions-closed, opened vertically (90 degrees) and fully opened for ingress and egress. FIG. 6 show one ramp fully open and ready for a wheel chair occupant to ingress from the floor/ground. FIGS. 7 and 8 show the occupant loaded and the ramp put in the lift position. FIG. 9 shows the occupant raised to the egress height. And FIG. 10 shows the occupant leaving the lift platform after the other ramp has been deployed. The design in this patent assumes that the PVPL 1 is a base design operated manually. The PVPL 1 after set up can also be automated with actuators for opening and closing the ramps, and raising or lowering the lift using remote control. The PVPL 1 is designed to be truly portable and transportable to wherever it is required. If it is to be transported by a vehicle, then a separate hitch mount would likely be required.

DETAILED DESCRIPTION

Figure 12:
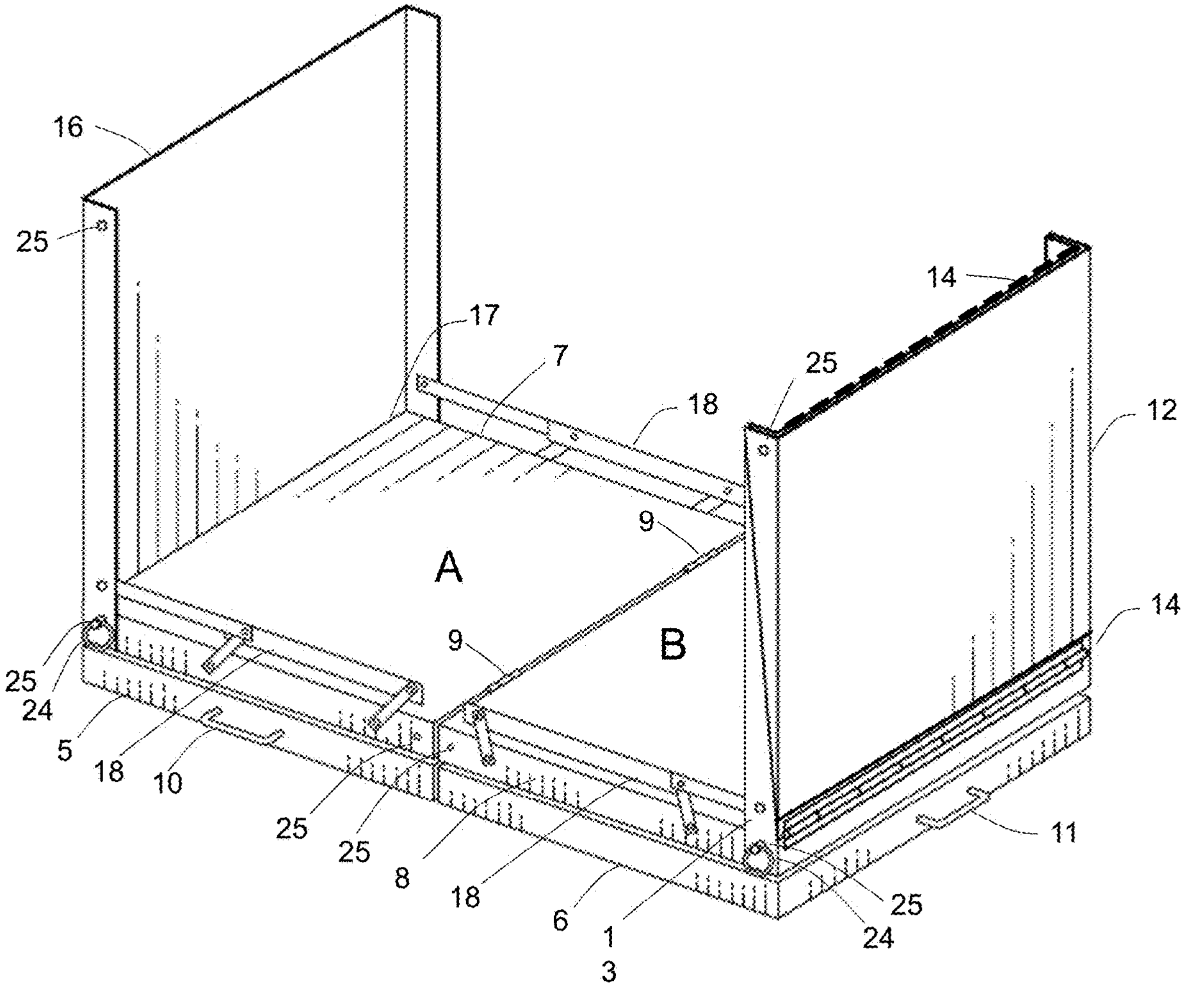
Figure 13:
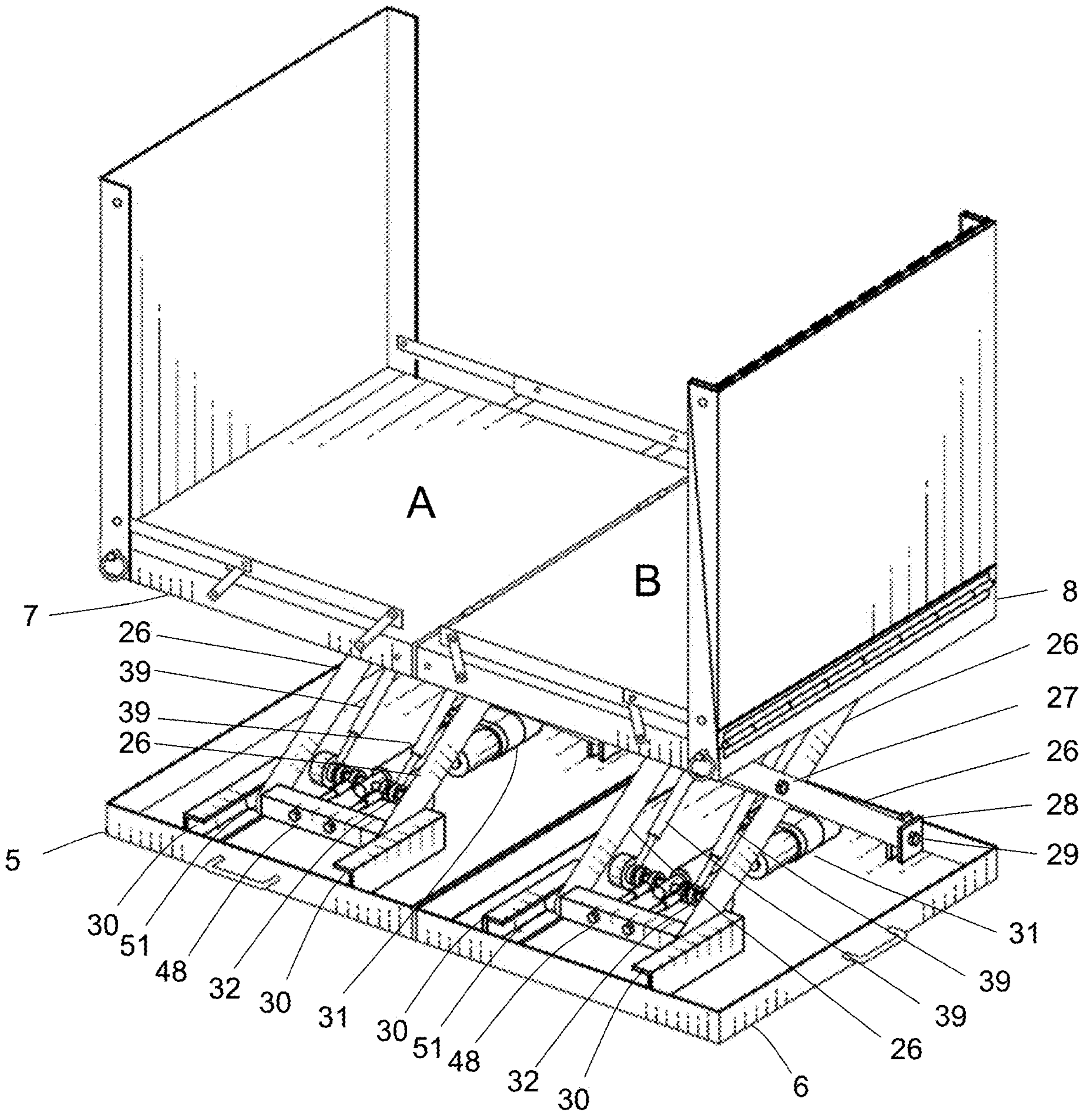
Figure 14:
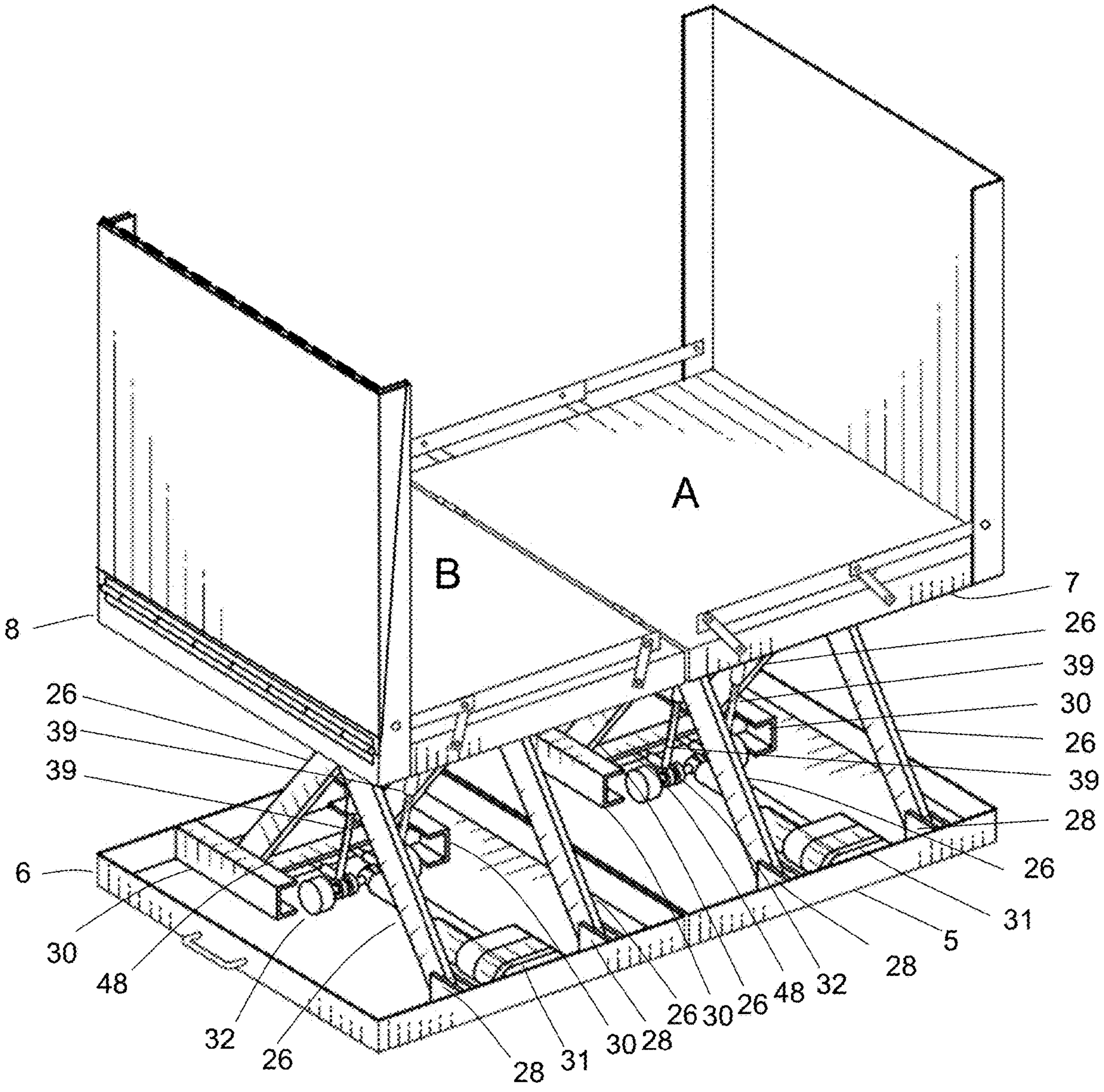
Figure 15:
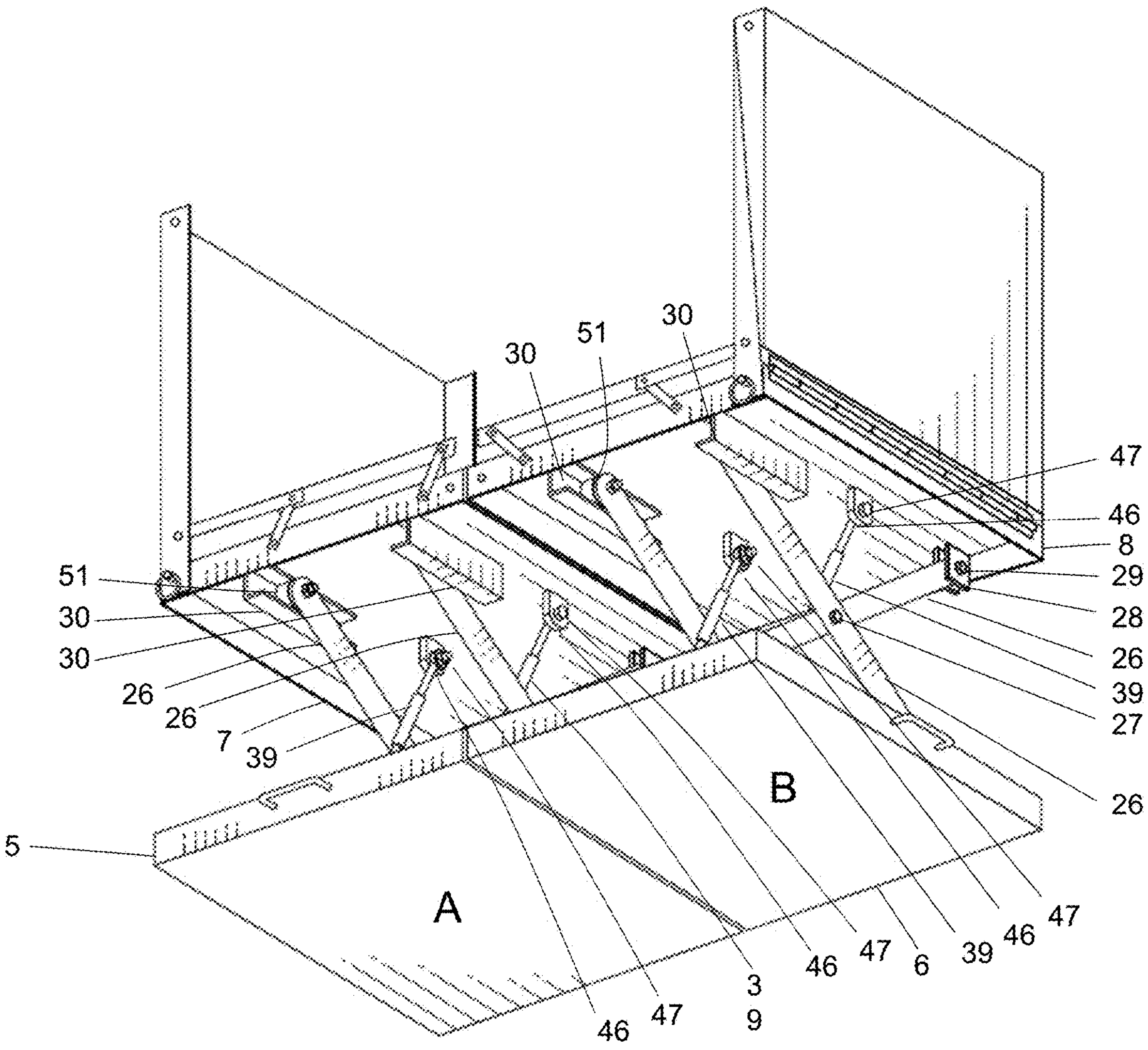
Figure 16:
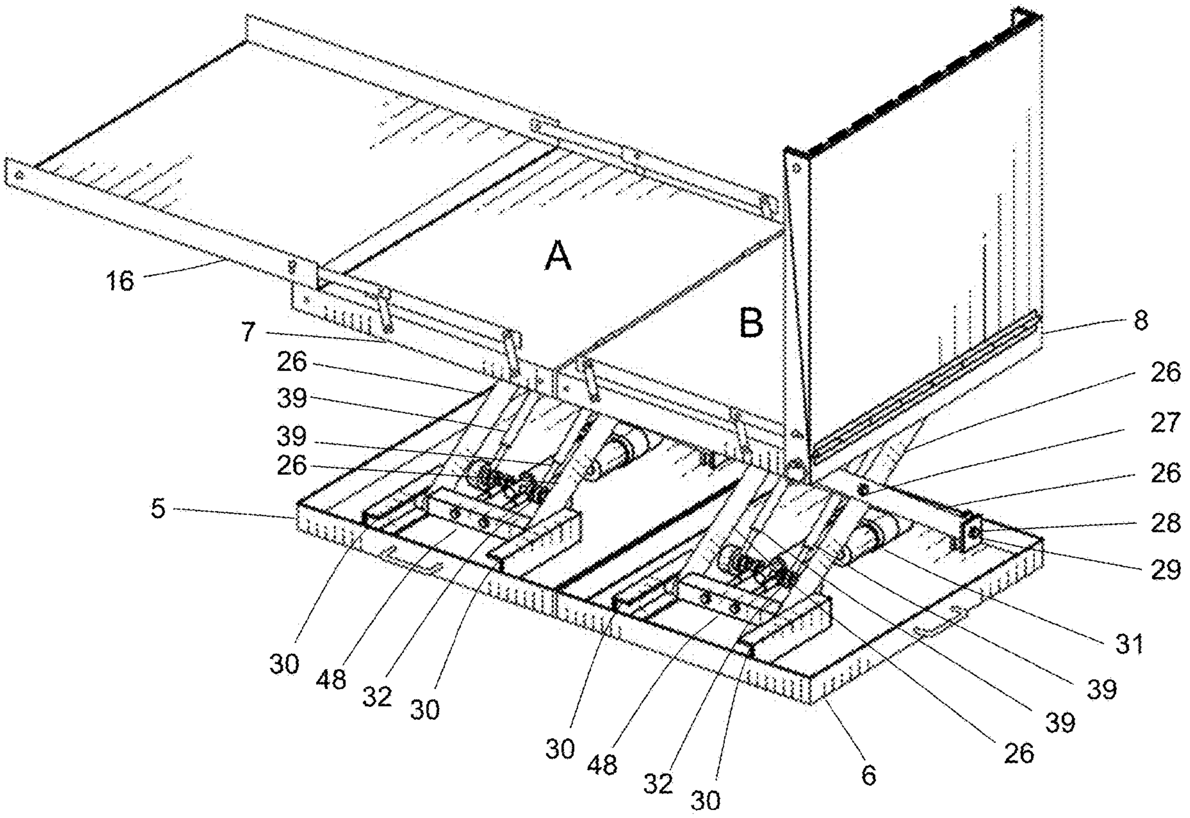

FIGS. 11-17 show the PVPL from various views. FIG. 11 shows the PVPL with the ground ramp A 12 and ground ramp B 13 fully deployed and the elevation ramp 16 set vertically for occupant security. FIG. 12 shows the PVPL with the ground ramps A 12 and B 13 and elevation ramp 16 raised vertical to secure the occupant on the platform and is ready to be raised. FIGS. 13-15 show the PVPL in the same occupant secure platform position, but now at full height exposing the inner details of the lift mechanisms. FIG. 16 shows the lift at full height, but now with the elevation ramp 16 deployed allowing ingress to or egress.

Figure 17:
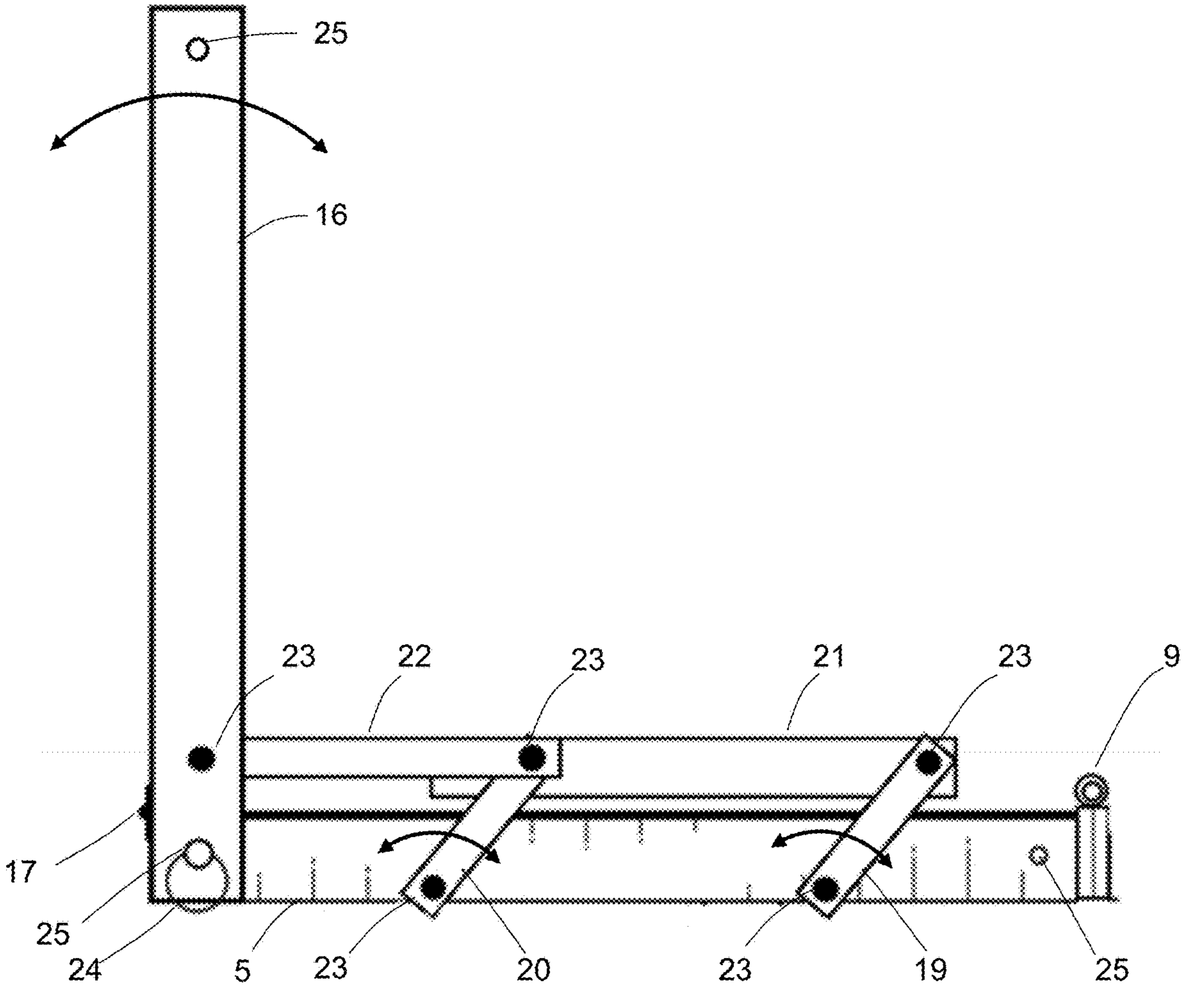

Referring back to FIGS. 11 and 12, the present invention relates to a wheelchair or walker lift having lifting sections A and B that are hinge 9 coupled. Lifting section A is comprised of base A 5 and a lifting platform A 7. Base A 5 has a handle A 10 that is used to manually lower or raise the closed PVPL from a vertical position after being maneuvered in place during setup. The elevation ramp 16 is hinge 17 coupled to the lifting platform A 7. The elevation ramp 16 has fixed vertical sides that adds strength, provides occupant security and is linked to security fencing 18. Security fencing 18 is deployed on each side of the lifting platform A 7 when the elevation ramp 16 is deployed. This is accomplished by having the security fencing 18 hinge linked to the elevation ramp 16. FIG. 17 shows the security fence 18 detail as connected between lifting platform A 7 and elevation ramp 16. The security fencing 18 consists of fence post A 19 and fence post B 20 hinge coupled to the lifting platform A 7 with shoulder rivets 23. These two fence posts are hinge coupled together with a horizontal fence link 21 and shoulder rivets 23. Fence post B 20, horizontal fence link 21 and connecting fence link 22 are linked together with a shoulder rivet 23. The connecting fence link 22 is also hinge coupled to the elevation ramp 16 with a shoulder rivet 23. The elevation ramp 16 is locked in place either in the vertical position shown or in the closed position with a pin 24 inserted into a pin hole 25.

Referring back to FIGS. 11 and 12, lifting section B is comprised of base B 6 and a lifting platform B 8. Base B 6 has a handle B 11 that is used to open and close the lifting sections B from lifting section A. The ground ramp B 13 is hinge 15 coupled to the lifting platform B 8. The ground ramp B 13 has fixed vertical sides that adds strength, provides occupant security and is linked to security fencing 18. A second ground ramp A 12 is hinge 14 coupled to ground ramp B 13. This ramp has tapered sides that rest on the floor/ground to support the appropriate ramp angle. Security fencing 18 is deployed on each side of the lifting platform B 8 when the ground ramp B 13 and A 12 are deployed. This is accomplished by having the security fencing 18 hinge linked to the ground ramp B 13. The security fence 18 detail is consistent, but opposite of the detail shown in FIG. 18 for the lifting section A side of the PVPL. FIG. 12 shows the ground ramp B 13 locked in place in the vertical position with a pin 24 inserted into pin hole 25.

FIGS. 13-16 show the PVPL at full height with different perspectives exposing the inner detail of the lifting mechanisms. The lifting mechanisms are identical for both lifting sections A and B. The following detailed description is for lifting section A. The lifting platform A 7 is disposed on an upper part of two double X shaped support arms 26 hinged together with axis pins/fasteners 27. Each support arm is hinge coupled to the base A 5 or the lifting platform A 7 (only visible in FIG. 15 lifting section B) on one side and a roller on the other. This design is also known as a scissor lift. Lifting platform A 7 and base A 5 have channels 30 attached for containment and movement of a roller 51 affixed to the end of each support arm 26. Lifting platform A 7 and base A 5 have hinge tabs 28 for the support arms on the end opposite the roller 52. Each support arm has a hinge pin/fastener 29 to create hinge points at the hinge tabs 28. There is also a support arm axis pin/fastener 27 where each set of the two support arms 26 intersect. The scissor action of the support arms allows the lift platform A 7 to move up or down.

A key enabler for this low-profile design is the two-stage lift actuation contained in each lifting section. Each lifting section has a high force, low speed pull/push actuator 31. It can be either electric or hydraulic. Actuation is in the pull direction when raising and in the push direction when lowering. During the approximately first one third of lifting height, stage one trunnion assembly 32 in each lifting section enables the platforms to be raised from the initial low-profile position by providing sufficient lift angle using double telescoping pushrod assemblies 39. FIG. 15 shows these telescoping pushrod assemblies 39 pushing directly on the underside of lifting platform A 7 and B 8 through attachment tabs 46 and hinge pins/fasteners 47. For the last two thirds of lift height, the stage two trunnion assembly 48 takes over pulling directly on the scissor lift support arms 26, now having sufficient lift angle to replace the telescoping pushrod assemblies 39 in providing the lifting force. FIG. 16 shows the elevation ramp 16 fully deployed.

Figure 18:
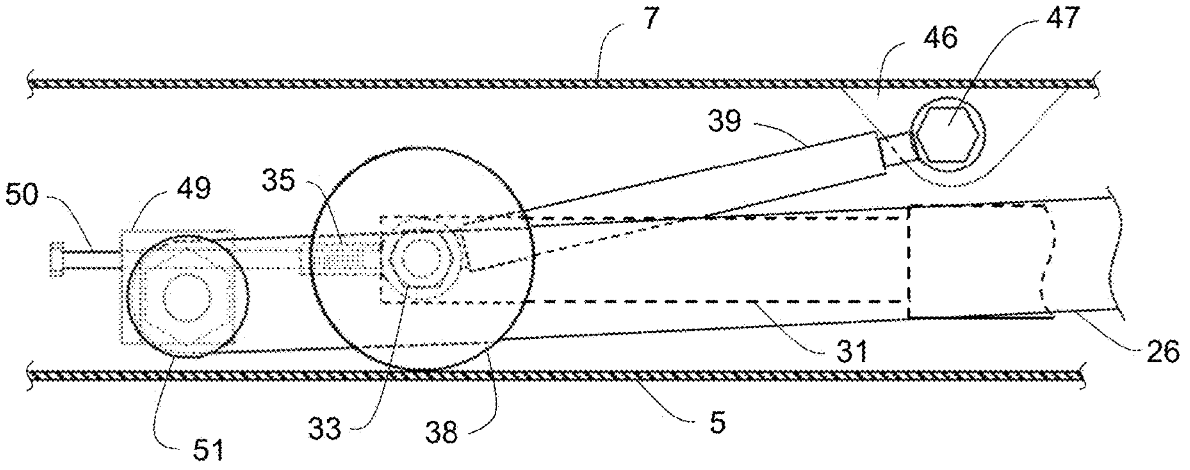
Figure 19:
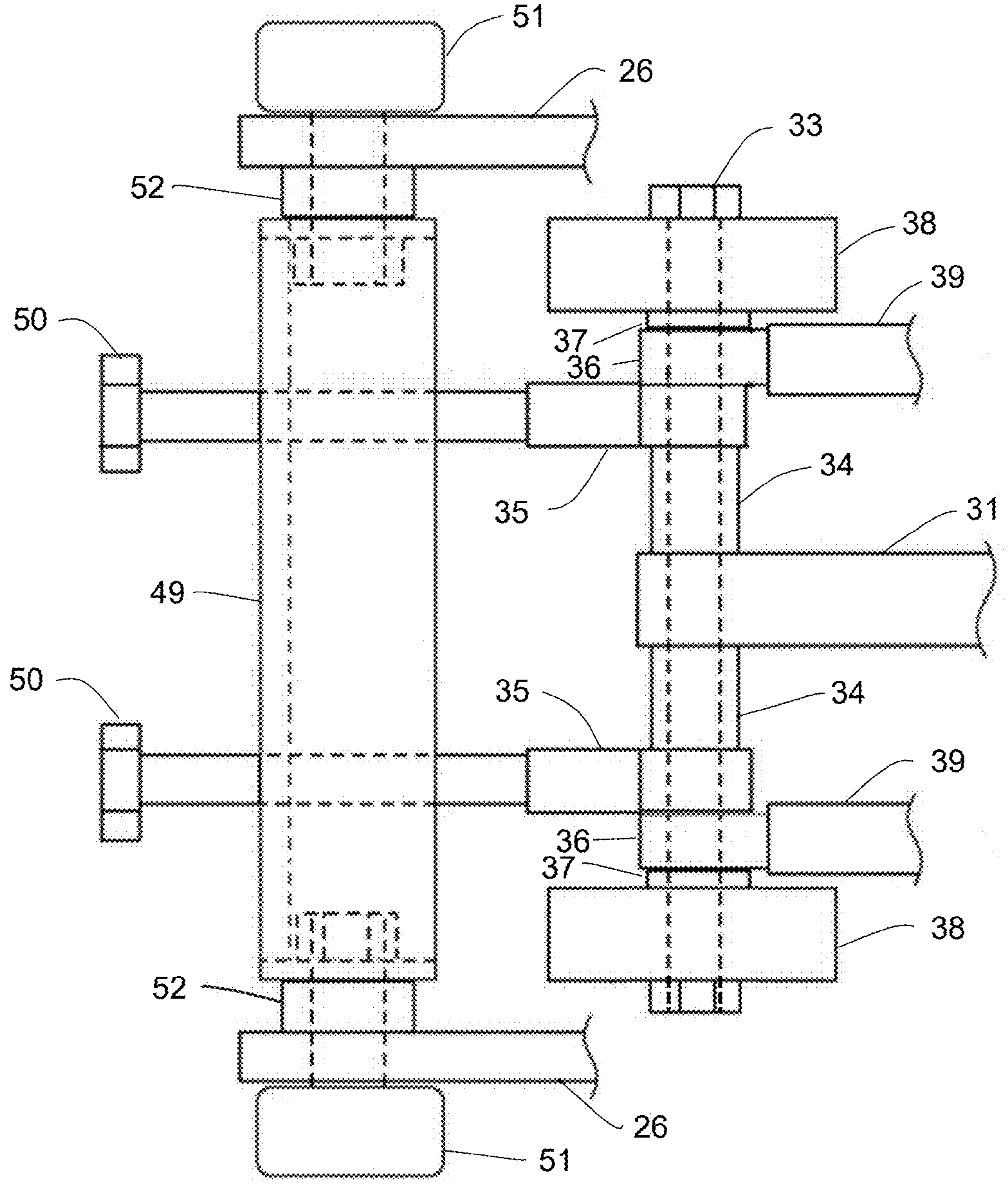
Figure 20:
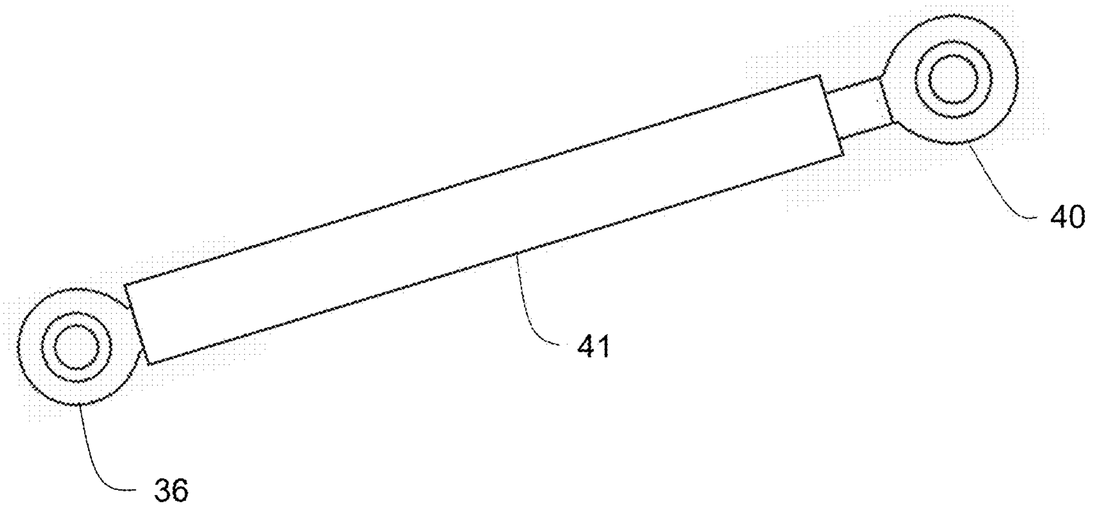
Figure 21:
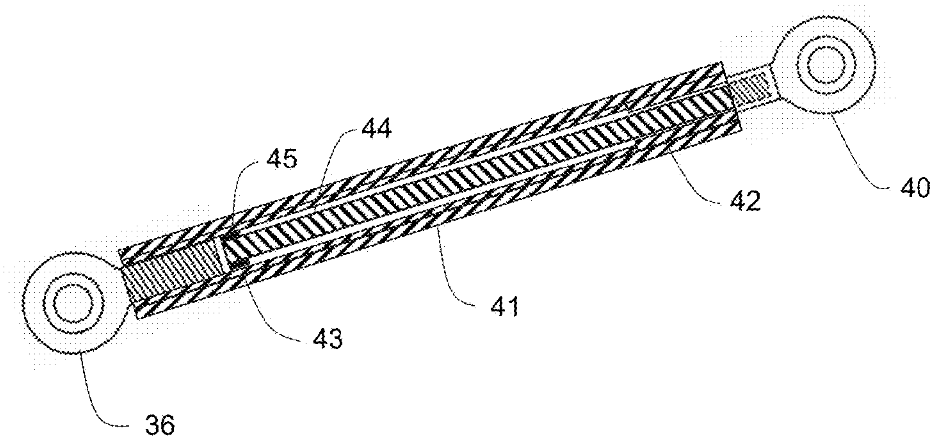

FIGS. 18-26 show the lift mechanism detail for lifting section A (lifting section B is identical) as it moves from the initial full down low-profile position, raising with stage one through the transition between stage one and stage two, then through to full lift height. When lifting is initiated, the actuator 31 pulls on the stage one trunnion assembly 32 (FIGS. 18 and 19). The stage one trunnion assembly 32 consists of a through bolt/shaft 33 hinge coupled to the actuator 31. On each side of the actuator 31 mounted coaxially on the through bolt/shaft 33 is a stage one first spacer 34, a stage two pull rod tie rod 35, a stage one telescoping pushrod lower tie rod end 36, a stage one second spacer 37 and a stage one wheel 38. The stage one wheels 38 are sized so that the center axis is the same as the actuator 31 center line. The telescoping pushrod assemblies 39 in the fully collapsed position provide the necessary lift angle pushing directly on lifting platform A 7 through attachment tabs 46 hinge coupled with attachment pin/fastener 47. The stage two pull rods 50 are connected between the stage one trunnion assembly 32 through the stage two pull rod tie rod ends 35 and the stage two trunnion assembly 48. The actuator 31 initially pulls approximately one third of the total travel. In so doing the telescoping pushrod assemblies 39 push up against the lifting platform A 7 underside raising the platform with force necessary to raise it about one third of potential vertical travel. During this stage the force being applied by the telescoping pushrod assemblies 39 is high and lift speed is low. FIGS. 20 and 21 show the telescoping pushrod assembly 39 detail. FIG. 20 shows the telescoping pushrod assembly 39 fully collapsed side view and in the angle that supports the initial lifting angle. FIG. 21 is the same view, but as a cross section revealing the inner detail. The telescoping pushrod assembly 39 when fully collapsed is under compression when pulled by the actuator 31 as the stage one telescoping pushrod lower tie rod end 36 is coaxially installed on the stage one through bolt/shaft 33. The stage one telescoping pushrod lower tie rod end 36 is threadedly engaged in the telescoping pushrod middle sleeve 43. The telescoping pushrod middle sleeve 43, because the telescoping pushrod assembly 40 is fully collapsed, pushes directly on telescoping pushrod outer sleeve bushing 42, which is attached to the telescoping pushrod outer sleeve 41, that intern pushes directly on the telescoping pushrod upper tie rod end 40. The telescoping pushrod inner rod 44 is threadedly inserted into the telescoping pushrod upper tie rod end 40 that is hinge coupled to the telescoping pushrod attachment tab 46 with the telescoping pushrod attachment pin/fastener 47. The other end of the telescoping pushrod inner rod 44 is coaxially inserted into the telescoping pushrod outer sleeve bushing 42 ensuring compression force is inserted directly on the telescoping pushrod upper tie rod end 40. The telescoping pushrod inner rod stop 45 plays no role in the collapsed configuration. The compression force directly raises the lifting platform A 7.

Figure 22:
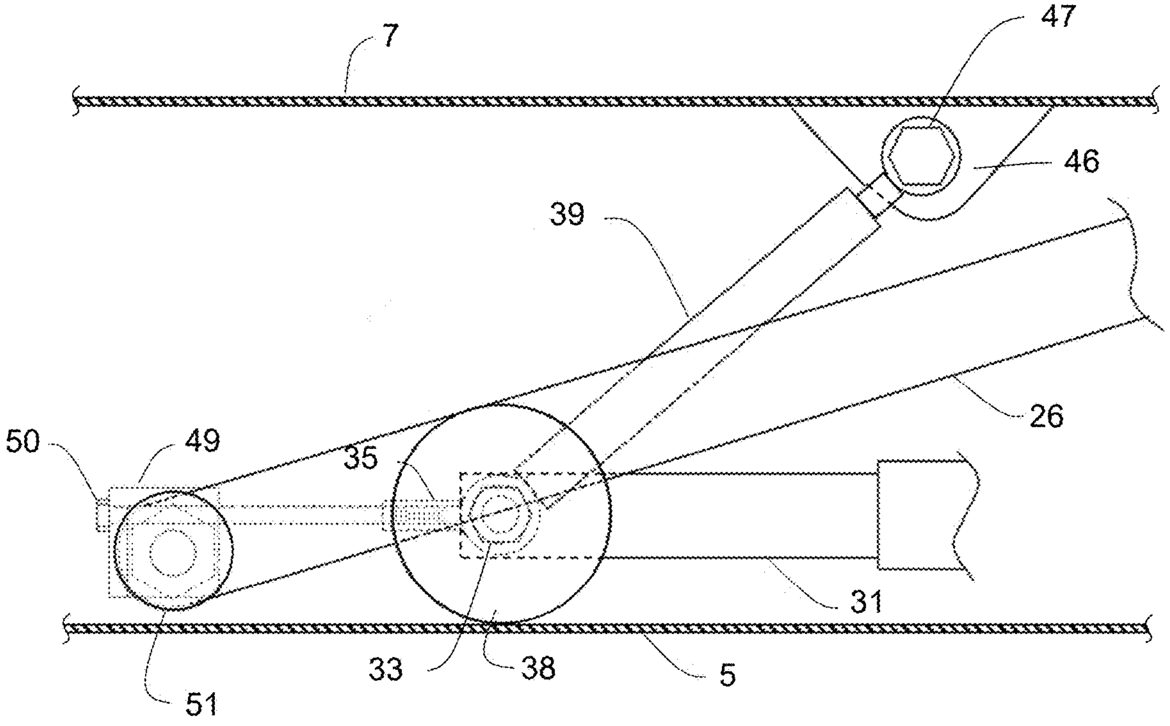
Figure 23:
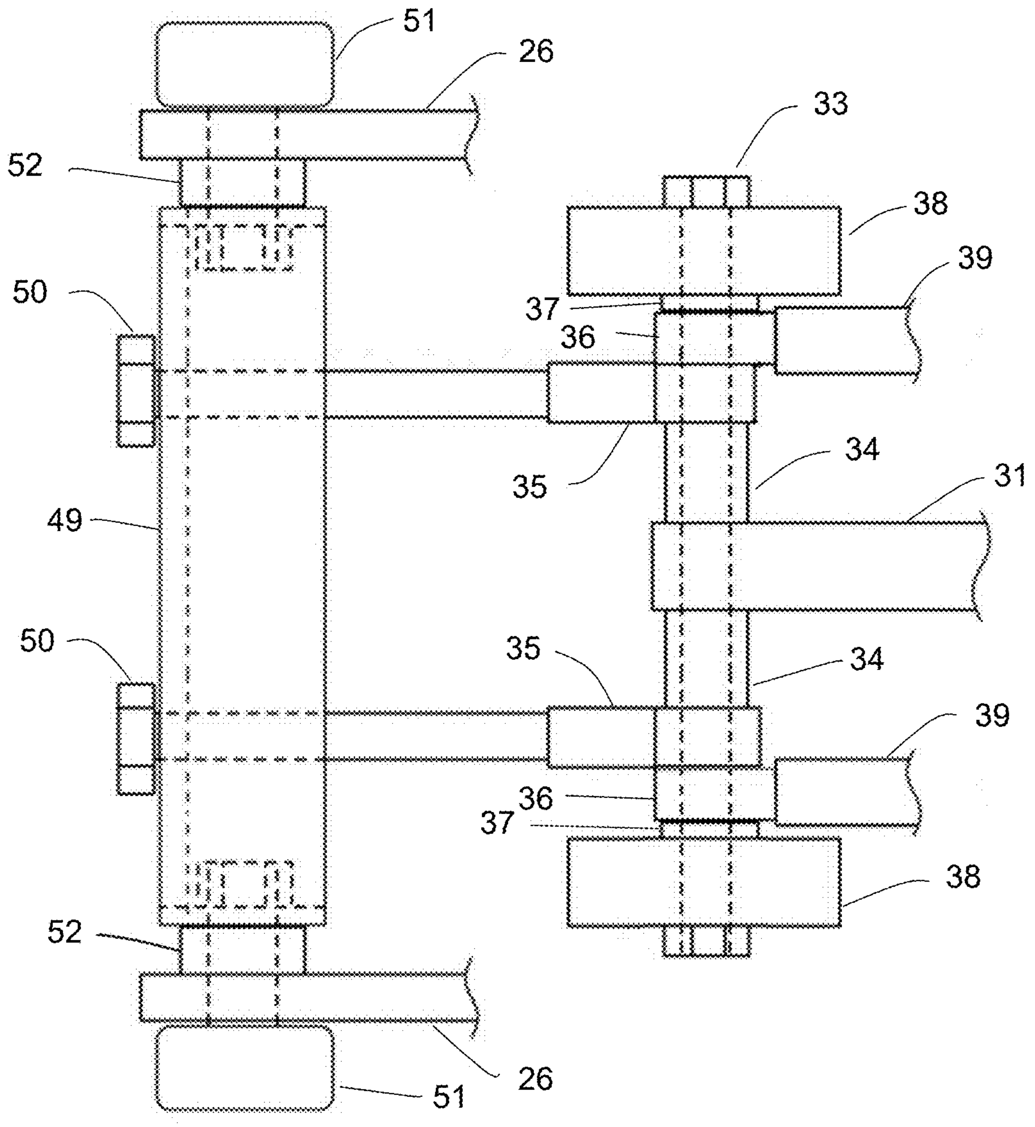

After approximately one third of actuator 31 travel, the lifting mechanism transitions to stage two. Slack in the stage two pull rods 50 has been eliminated. The actuator 31 begins to pull directly on the stage two pull bar 49 which is hinge coupled directly to the scissor lift rollers 51, support arms 26 and stage two spacers 52 (FIGS. 22 and 23). Now the lifting platform A 7 begins to move up at a higher speed. The force being applied to the telescoping pushrod assemblies 39 is eliminated and they begin to start telescoping as the lifting platform A 7 is raised further.

Figure 24:
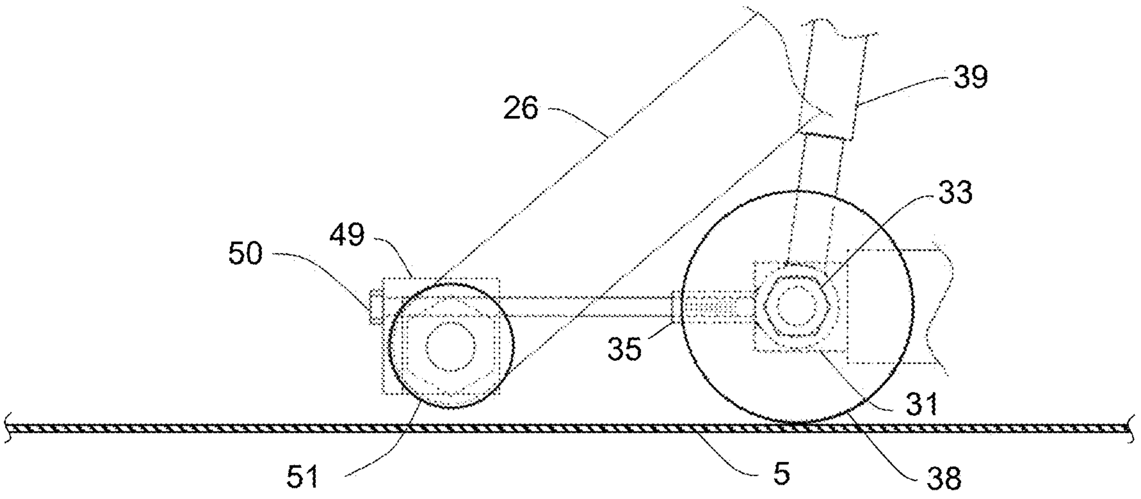
Figure 25:
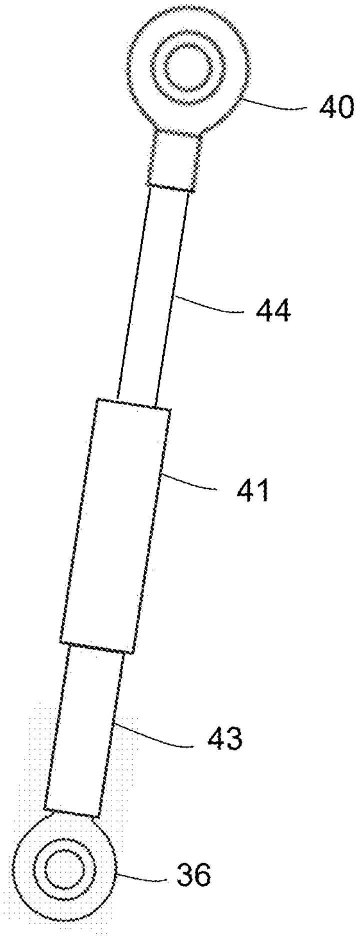
Figure 26:
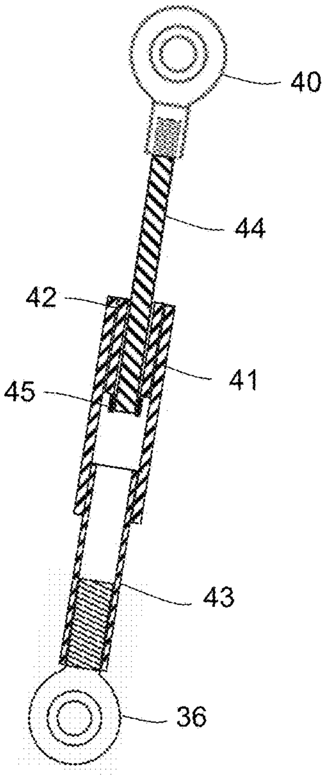

At the end of stage two, the telescoping pushrod assemblies 39 are fully extended (approximately double the starting length) and the actuator 31 has fully traveled pulling the second stage trunnion assembly 48 the remaining approximate two thirds of actuator 31 travel. FIG. 24 shows a side view of the lifting mechanisms at full lifting platform A 7 height. FIGS. 25 and 26 show the telescoping pushrod assembly 39 fully extended and at the final lift angle. This sequence is reversed to lower the platforms.

PRIOR ART

There are two main designs of vertical platform lifts used for the disabled. One type uses a direct vertical lifting design similar to how a fork lift truck raises and lowers a load. There is a raising/lowering drive unit attached to the side of a platform. The raising/lowering motion is driven by different propulsion mechanics such as hydraulic cylinders, air cylinders, rack and pinion or electric actuators. This raising/lowering motion is directly translated into the raising/lowering of the platform.

The other lift design utilizes a scissor lift mechanism. Some are two single scissors in an X configuration parallel to each together or can be connected to multiple stacked scissors for increased raising height. Both vertical platform lift designs are used in many applications beyond raising/lowering disabled persons. This patent uses the scissor lift design approach hence the references sited. This patent has unique art as described in the design details.

Recent Korean patents KR102598335B1/KR20230099992A and KR102239969B1/KR102239969B1/KR102239971B1 are full-size scissor lift platforms to accommodate wheelchairs or walkers. They are lower profile recognizing the need for low platform height for ease of ingress and egress and the inability for a scissor lift to begin lifting from a low-profile starting point due to the initial extremely large forces acting on the scissor arms. However, there are some unique differences in these designs compared to this patent. These Korean patents use a single, large platform rather than a light-weight, low-profile, compact bifold lift design. These earlier designs have actuators pushing against the central scissor arm axis which doubles the requiring lifting force. Also, these designs requiring both extremely high horizontal and vertical force vectors due to the actuators pushing horizontally against ramps or scissor arms as they also push upward on the platform. They are also more complex requiring lever arms and more actuation. It is much more effective to use a two-stage design with the first stage pushing directly on the underside of the platform for greater leverage followed by the second stage pulling on the scissor lift support arms.

REFERENCES CITED

| Publication Number | Date | Inventor |
|---|---|---|
| KR102598335B1 | November 2023 | 노태진 |
| KR102423522B1 | July 2022 | 주충호 |
| KR20220056392A | May 2022 | 주충호 |
| KR20230099002A | December 2021 | 노태진 |
| KR102239969B1 | April 2021 | 고경자 |
| KR102239971B1 | April 2021 | 고경자 |
| KR102239978B1 | April 2021 | 고경자 |
| KR102298545B1 | September 2021 | 정근섭 |
| KR102126043B1 | June 2020 | 이명철 |
| KR102077249B1 | February 2020 | 초은석 |
| KR102044146B1 | November 2019 | 정재성 |
| DE202017107211U1 | August 2017 | Kiefer-Strickrodt Manuela |
| KR101372262B1 | March 2014 | 고경자 |
| KR20060072656A | October 2012 | 고경자 |
| KR101487844B1 | November 2012 | 주식회사 세웅 |
| KR101083365B1 | November 2011 | 초은석 |
| KR101020722B1 | March 2011 | 임승구 |
| KR100936020B1 | January 2010 | 김동섭 |
| KR20090014717A | February 2009 | 김동섭 |
| US5105915A | April 1992 | Jerry M. Gray |

What is claimed is:

1. A portable vertical platform lift consisting of two bifold lifting sections hinge coupled together each comprising:

a base;

a first channel affixed to an inside end of said base;

a second channel affixed to said inside end of said base opposite said first channel;

a set of two base pivot tabs affixed to said inside end of said base opposite said first and second channels;

a lifting platform;

a third channel affixed to an inside end of said lifting platform;

a fourth channel affixed to said inside end of said lifting platform opposite said third channel;

a set of lifting platform pivot tabs affixed to said inside end of said lifting platform opposite said third and fourth channels;

a first support arm having a roller mounted on an end inserted into said first channel of said base and the other end hinge coupled to said lifting platform pivot tabs opposite said third channel and a second support arm having a roller mounted on an end inserted into said third channel of said lifting platform and the other end hinge coupled to said base pivot tabs opposite said first channel with both support arms in a cross or X shape hinged where said first and second support arms cross with a first axis pin or fastener;

a third support arm having a roller mounted on an end inserted into said second channel of said base and the other end hinge coupled to said lifting platform pivot tab opposite said fourth channel and a fourth support arm having a roller mounted on an end inserted into said fourth channel of said lifting platform and the other end hinge coupled to said base pivot tab opposite said second channel with both support arms in a cross or X shape hinged where the third and fourth support arms cross with a second axis pin or fastener;

an up or down actuator having a fixed side pinned to said base and a push or pull end hinge coupled to a stage one trunnion;

a stage two trunnion interconnecting said rollers mounted on the ends of said first and third support arms and linked to said stage one trunnion with a set of two pull rods;

a set of two telescoping pushrods hinge coupled between said stage one trunnion and inside of said lifting platform allowing direct pushing up of said lifting platform in stage one operation and telescoping in stage two operation;

a two-piece hinge coupled bifold ground ramp hinge coupled to one said lifting platform of one said lifting section;

an elevation ramp hinge coupled to the other said lifting platform of the other said lifting section;

a security fence for each side of said lifting platforms hinge coupled to either said ground ramp or said elevation ramp;

a switch and power supply to operate said up or down actuators.

2. A portable vertical platform lift consisting of two bifold lifting sections hinge coupled together each comprising:

a base;

a first channel affixed to an inside end of said base;

a second channel affixed to said inside end of said base opposite said first channel;

a set of two base pivot tabs affixed to said inside end of said base opposite said first and second channels;

a lifting platform;

a third channel affixed to an inside end of said lifting platform;

a fourth channel affixed to said inside end of said lifting platform opposite said third channel;

a set of lifting platform pivot tabs affixed to said inside end of said lifting platform opposite said third and fourth channels;

a first support arm having a roller mounted on an end inserted into said first channel of said base and the other end hinge coupled to said lifting platform pivot tabs opposite said third channel and a second support arm having a roller mounted on an end inserted into said third channel of said lifting platform and the other end hinge coupled to said base pivot tabs opposite said first channel with both support arms in a cross or X shape hinged where said first and second support arms cross with a first axis pin or fastener;

a third support arm having a roller mounted on an end inserted into said second channel of said base and the other end hinge coupled to said lifting platform pivot tab opposite said fourth channel and a fourth support arm having a roller mounted on an end inserted into said fourth channel of said lifting platform and the other end hinge coupled to said base pivot tab opposite said second channel with both support arms in a cross or X shape hinged where the third and fourth support arms cross with a second axis pin or fastener;

an up or down actuator having a fixed side pinned to said base and a push or pull end hinge coupled to a stage one trunnion;

a stage two trunnion interconnecting said rollers mounted on the ends of said first and third support arms and linked to said stage one trunnion with a set of two pull rods;

a set of two telescoping pushrods hinge coupled between said stage one trunnion and inside of said lifting platform allowing direct pushing up of said lifting platform in stage one operation and telescoping in stage two operation;

a two-piece hinge coupled bifold ground ramp hinge coupled to one said lifting platform of one said lifting section;

an actuator to maneuver said ground ramp;

an elevation ramp hinge coupled to the other said lifting platform of the other said lifting section;

an actuator to maneuver said elevation ramp;

a security fence for each side of said lifting platforms hinge coupled to either said ground ramp or said elevation ramp;

a remote control and power supply to operate said ground ramp actuator or said elevation ramp actuator or said up or down actuators.

* * * * *